United States Patent
Ishii et al.

(10) Patent No.: US 9,066,347 B2
(45) Date of Patent: Jun. 23, 2015

(54) BASE STATION DEVICE AND USER DEVICE

(75) Inventors: Hiroyuki Ishii, Tokyo (JP); Hiromasa Umeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 13/985,356

(22) PCT Filed: Feb. 14, 2012

(86) PCT No.: PCT/JP2012/053317
§ 371 (c)(1),
(2), (4) Date: Aug. 14, 2013

(87) PCT Pub. No.: WO2012/111638
PCT Pub. Date: Aug. 23, 2012

(65) Prior Publication Data
US 2013/0322394 A1    Dec. 5, 2013

(51) Int. Cl.
*H04W 88/02* (2009.01)
*H04W 88/08* (2009.01)
*H04W 72/04* (2009.01)
*H04W 8/24* (2009.01)

(52) U.S. Cl.
CPC ............ *H04W 72/0453* (2013.01); *H04W 8/24* (2013.01); *H04W 72/0413* (2013.01)

(58) Field of Classification Search
CPC .................................................. H04W 72/1284
USPC .......................................................... 370/496
See application file for complete search history.

(56) References Cited

U.S. PATENT DOCUMENTS

| | | | |
|---|---|---|---|
| 2007/0030839 A1* | 2/2007 | Vimpari et al. | 370/342 |
| 2009/0052357 A1* | 2/2009 | Suo et al. | 370/280 |
| 2009/0093255 A1 | 4/2009 | Balasubramanian | |
| 2010/0182923 A1* | 7/2010 | Miki et al. | 370/252 |
| 2010/0246561 A1* | 9/2010 | Shin et al. | 370/345 |
| 2010/0317301 A1* | 12/2010 | Wang et al. | 455/127.1 |
| 2011/0026475 A1 | 2/2011 | Lee et al. | |
| 2011/0182201 A1* | 7/2011 | Pajukoski et al. | 370/252 |
| 2011/0243012 A1* | 10/2011 | Luo et al. | 370/252 |
| 2011/0267955 A1* | 11/2011 | Dalsgaard | 370/241 |
| 2012/0188903 A1* | 7/2012 | Futaki | 370/252 |
| 2012/0213096 A1* | 8/2012 | Krishnamurthy et al. | 370/252 |
| 2013/0336263 A1* | 12/2013 | Wang | 370/329 |

(Continued)

FOREIGN PATENT DOCUMENTS

| | | | | |
|---|---|---|---|---|
| CN | 101238751 A | | 8/2008 | |
| CN | 101785228 A | | 7/2010 | |
| CN | 102123457 A | * | 7/2011 | ............ H04W 36/02 |

(Continued)

OTHER PUBLICATIONS

Ishii et al., "CA for Bandwidth Extension in LTE Advanced", Sep. 2010, NTT DOCOMO Technical Journal vol. 12, No. 2, pp. 10-19.*

(Continued)

*Primary Examiner* — Omar Ghowrwal
(74) *Attorney, Agent, or Firm* — Osha Liang LLP

(57) ABSTRACT

A base station device eNB according to the embodiment is provided with a Capability signal reception unit 202 configured to receive, from a user device UE, a Capability signal that notifies whether there is a capability to simultaneously transmit an uplink signal in an allocated discontinuous frequency band, and the Capability signal is configured to be notified for each operation band.

6 Claims, 2 Drawing Sheets

| FREQUENCY BAND NUMBER | INFORMATION NOTIFYING WHETHER UPLINK SIGNAL CAN BE SIMULTANEOUSLY TRANSMITTED IN DISCRETE FREQUENCY BAND |
|---|---|
| #1 | 0 |
| #2 | 1 |
| #3 | 1 |
| ... | |
| #N | 0 |

(56) References Cited

U.S. PATENT DOCUMENTS

2014/0078998 A1* 3/2014 Hsieh et al. .................. 370/329
2014/0119323 A1* 5/2014 Chung et al. .................. 370/329

FOREIGN PATENT DOCUMENTS

| JP | 2010-263256 A | 11/2010 | |
|---|---|---|---|
| KR | 10-2011-0011517 A | 2/2011 | |
| WO | WO 2011040516 A1 * | 4/2011 | ............ H04W 52/02 |

OTHER PUBLICATIONS

RAN WG4; "Reply LS on Rel-10 UE category"; 3GPP TSG RAN WG1 Meeting #63bis, R1-110006; Dublin, Ireland, Jan. 17-21, 2011 (4 pages).
3GPP TS 36.211 V9.1.0; "3rd Generation Partnership Project; Technical Specification Group Radio Access Network; Evolved Universal Terrestrial Radio Access (E-UTRA); Physical Channels and Modulation (Release 9)"; Mar. 2010 (85 pages).
3GPP TR 36.913 V8.0.1; "3rd Generation Partnership Project; Technical Specification Group Radio Access Network; Requirements for further advancements for Evolved universal Terrestrial Radio Access (E-UTRA) (LTE-Advanced) (Release 8)"; Mar. 2009 (15 pages).
3GPP TS 36.101 V9.5.0; "3rd Generation Partnership Project; Technical Specification Group Radio Access Network; Evolved Universal Terrestrial Radio Access (E-UTRA); User Equipment (UE) radio transmission and reception (Release 9)"; Oct. 2010 (187 pages).
International Search Report for corresponding International Application No. PCT/JP2012/053317, mailed Apr. 17, 2012 (3 pages)
Written Opinion for corresponding International Application No. PCT/JP2012/053317, mailed Apr. 17, 2012 (3 pages).
Korean Office Action issued in Korean Patent Application No. 10-2013-7022012, mailing date Oct. 4, 2013, with English translation thereof (5 pages).
Canadian Office Action issued in Canadian Patent Application No. 2,824,846, mailing date Nov. 18, 2013 (3 pages).
Office Action in counterpart Canadian Patent Application No. 2,824,846, mailed on May 5, 2014 (3 pages).
Office Action in counterpart Chinese Patent Application No. 201280008830.8, mailed May 5, 2014 (10 pages).
Office Action in corresponding Korean Patent Application No. 10-2013-7022012 dated Feb. 17, 2014, with translation (5 pages).
Office Action issued in corresponding Korean Patent Application No. 10-2013-7022012, mailed Jul. 16, 2014 (5 pages).
Extended Search Report issued in corresponding European Application No. 12746566.4, mailed Sep. 5, 2014 (7 pages).
MediaTek; "Discussion on CA Capability"; 3GPP TSG-RAN WG4 Meeting Ad Hoc 3GPPRAN4#2, R4-101137; Dublin, Ireland; Apr. 12-16, 2010 (3 pages).
MediaTek; "Capability Negotiation for CC Configuration"; 3GPP TSG RAN WG2 Meeting #69, R2-101147; San Francisco, USA; Feb. 22-26, 2010 (4 pages).
Office Action issued in corresponding Canadian Application No. 2,824,846, mailed Sep. 30, 2014 (3 pages).
Office Action issued Nov. 4, 2014 in corresponding Chinese Application No. 201280008830.8 (with translation) (10 pages).

* cited by examiner

| FREQUENCY BAND NUMBER | INFORMATION NOTIFYING WHETHER UPLINK SIGNAL CAN BE SIMULTANEOUSLY TRANSMITTED IN DISCRETE FREQUENCY BAND |
|---|---|
| #1 | 0 |
| #2 | 1 |
| #3 | 1 |
| ... | |
| #N | 0 |

BASE STATION DEVICE AND USER DEVICE

TECHNICAL FIELD

The present invention relates to a technical field of mobile communication, and especially relates to a base station device and a user device in a mobile communication system using a next-generation mobile communication technology.

BACKGROUND ART

A successor communication system of the wideband code division multiplexing (WCDMA) system, the high speed downlink packet access (HSDPA) system, the high speed uplink packet access (HSUPA) system, and the like, that is, the long term evolution (LTE) system has been examined by the standardization organization of WCDMA: 3GPP, and a specification operation has been in progress.

As a wireless access system in the LTE system, the orthogonal frequency division multiplexing access (OFDMA) system is defined for a downlink, and the single carrier frequency division multiplexing access (SC-FDMA) system is defined for an uplink (for example, see Non-Patent Document 1).

The OFDMA system is a multicarrier transmission system in which a frequency band into a plurality of narrow frequency bands (subcarriers) and transmission is performed by sending data on the subcarriers.

According to the OFDMA system, the subcarriers are orthogonally aligned on a frequency axis closely to each other, so that high speed transmission can be realized and an increase in utilization efficiency of frequencies can be expected.

The SC-FDMA system is a single carrier transmission system in which the frequency band is divided for each user device UE (user equipment) and transmission is performed using different frequency bands among a plurality of user devices UE.

According to the SC-FDMA system, interference among the user devices UE can be easily and effectively reduced and fluctuation of transmission power can be reduced. Therefore, the SC-FDMA system is favorable in terms of lower power consumption of the user devices UE, expansion of coverage, and the like.

In the LTE system, both in the downlink and the uplink, communication is performed by allocating one or more resource blocks (RB) to the user device UE.

A base station device eNB determines to which user device UE a resource block is allocated among the plurality of user devices UE for each subframe (1 ms in the LTE system) (such a process is called "scheduling").

In the downlink, the base station device eNB is configured to transmit a downlink data signal to a user device UE selected in the scheduling using one or more resource blocks.

Further, in the uplink, a user device UE selected in the scheduling transmits an uplink data signal to the base station device eNB using one or more resource blocks.

Note that the uplink data signal is transmitted through a physical uplink shared channel (PUSCH), and the downlink data signal is transmitted through a physical downlink shared channel (PDSCH).

Here, the uplink data signal may be called "PUSCH signal", and the downlink data signal may be called "PDSCH signal".

Further, as a successor communication system of the LTE system, an LTE-Advanced system (LTE system on and after Release 10) has been examined in 3GPP (for example, see Non-Patent Document 2).

In the LTE-Advanced system, performing "carrier aggregation" is agreed as a required condition. Here, the "carrier aggregation" means simultaneously performing communication using a plurality of carriers.

For example, when the "carrier aggregation" is performed in the uplink, a different carrier is used in each component carrier (hereinafter, CC). Therefore, the user device UE transmits an uplink signal (that is, an uplink data signal and an uplink control signal) using the plurality of carriers.

Further, when the "carrier aggregation" is performed in the downlink, a different carrier is used in each CC. Therefore, the base station device eNB transmits a downlink signal (that is, a downlink data signal and a downlink control signal) using the plurality of carriers.

In the uplink of the LTE system, as described above, the single carrier transmission system is used. Therefore, the uplink signal is transmitted in a continuous frequency band.

On the other hand, in the uplink of the LTE-Advanced system, transmission of the uplink signal in a discontinuous frequency band has been examined in the following case.

<Case 1>

When the "carrier aggregation" is performed, an uplink data signal is transmitted in different CCs.

<Case 2>

When the "carrier aggregation" is performed, an uplink data signal and an uplink control signal are transmitted in different CCs.

Note that the uplink control signal is a signal transmitted through the physical uplink control channel (PUCCH), and may be called "PUCCH signal".

<Case 3>

An uplink data signal is transmitted in a discontinuous (that is, discrete) frequency band within a single carrier.

<Case 4>

An uplink data signal and an uplink control signal are transmitted in a discontinuous frequency band within a single carrier.

By transmitting the uplink data signal in the discontinuous (that is, discrete) frequency band like the above-described Cases 1 and 3, more flexible allocation of frequency bands becomes possible, and the communication efficiency in the uplink can be improved.

That is, there are typically a good quality frequency band and a poor quality frequency band due to influence of Fading and the like. When allocation of the discontinuous frequency band is performed, a good quality frequency band can be selected and allocated as the frequency band in which the uplink signal is transmitted. Therefore, the communication efficiency in the uplink can be improved.

Put another way, when only the allocation of a continuous frequency band is performed, it becomes difficult to select and allocate such a good quality frequency band. The communication efficiency in the uplink cannot be improved compared with the case where the allocation of the discrete frequency band is performed.

Further, by transmitting the uplink data signal and the uplink control signal in the discontinuous frequency band like the above-described Cases 2 and 4, processing in which an uplink control signal to be transmitted through the PUCCH is transmitted through the PUSCH or processing in which transmission of a part of the signals is stopped can be avoided.

By the way, when an uplink signal is transmitted in the above-described discontinuous frequency band, a problem of an increase in peak-to-average ratio (PAPR) occurs.

When the PAPR is increased, the user device UE transmits the uplink signal in a non-linear region of a power amplifier. Therefore, an interference power to an adjacent channel (to an adjacent frequency band) is increased.

To suppress the increase in interference power to an adjacent channel, the user device UE needs to incorporate a power amplifier having high linearity. However, it is not favorable for the system as a whole because it leads to an increase in cost and size of the user device UE.

Therefore, to avoid the above-described increase in cost and size of the user device UE, and to avoid the influence of the increase in PAPR, reduction of maximum transmission power in the user device UE has been examined. The reduction of maximum transmission power in this way is called "maximum power reduction (MPR)" (for example, see Non-Patent Document 3).

A value of the MPR is determined based on a transmission bandwidth of each block, a difference between frequencies of blocks, and the like when each of allocated discontinuous frequency bands is called "block".

In addition, when the maximum transmission power is reduced in this way, there is a problem of a decrease in cell coverage of an uplink. Therefore, typically, a minimum required value is defined as the value of the MPR.

Further, defining a control signal has been examined, which notifies whether the user device UE has a capability to transmit an uplink signal to the base station device eNB in a discontinuous frequency band.

By defining the control signal, the base station device eNB can grasp that the user device UE does not have the capability to transmit an uplink signal in a discontinuous frequency band, and by a method applied to the user device UE, it becomes possible to allocate a frequency band in which the uplink data signal and the uplink control signal are to be transmitted.

CITATION LIST

Non-Patent Literatures

Non-Patent Literature 1: 3GPP TS36.211 (V9.1.0), "Physical Channels and Modulation", May, 2008
Non-Patent Literature 2: 3GPP TS36.913 (V8.0.1), "Requirement for further advancements for Evolved Universal Terrestrial Radio Access (E-UTRA) (LTE-Advanced)"
Non-Patent Literature 3: 3GPP TS36.101 (V9.5.0), "E-UTRA UE radio transmission and reception"

SUMMARY OF INVENTION

Technical Problem

However, the above-described conventional mobile communication system has the following problems.

There are a high end mobile terminal to a low end mobile terminal that are user devices UE.

Here, it is possible for the high end mobile terminal to suppress the reduction of the maximum transmission power of the uplink signal at a maximum, to transmit the uplink signal in an allocated discontinuous frequency band, and to improve the communication efficiency in the uplink by applying the above-described MPR.

On the other hand, the low end mobile terminal may reduce the cost and complexity of the mobile terminal because of not transmitting the uplink signal in the allocated discontinuous frequency band and not supporting the MPR associated therewith.

In that case, the base station device eNB needs to distinguish the above-described high end mobile terminal and low end mobile terminal.

Further, as the value of the above-described MPR, a minimum required power reduction amount is defined in order to reduce the interference amount to the adjacent channel.

In that case, when there is a frequency band to be protected in a frequency band adjacent to a frequency band in which the uplink signal is transmitted, a larger value of the MPR needs to be defined.

On the other hand, when there is no frequency band to be protected in the frequency band adjacent to the frequency band in which the uplink signal is transmitted, a smaller value of the MPR is defined.

Further, when it is necessary to define the larger value of the MPR, more complex control may be applied, such as determining the value of the MPR in accordance with a frequency band in which the uplink signal is actually transmitted in order to suppress the reduction of the coverage to a minimum.

In such a case, as an operation of the user device UE, an operation like below may be favorable, in which the capability to transmit an uplink signal in a discontinuous frequency band is given only in a location where there is no frequency band to be protected in an adjacent frequency band, or the capability to transmit an uplink signal in a discontinuous frequency band is not given only in a location where there is a frequency band to be protected in an adjacent frequency band, in order to simplify the processing to be implemented.

However, when the control signal that notifies whether there is a capability to transmit an uplink signal in a discontinuous frequency band is just one, it becomes difficult to change the capability in accordance with the above-described frequency band.

Therefore, the present invention has been made in view of the above-described problems, and an objective of the present invention is to provide a base station device and a user device capable of determining whether the transmission of an uplink signal in a discontinuous frequency band is performed in accordance with the capability of the user device and a frequency band in which the user device UE actually performs communication, and of performing allocation of the frequency band in which the uplink signal is transmitted based on a result of the determination.

Solution to Problem

A first feature of the present invention is a base station device configured to wirelessly communicate with a user device in a mobile communication system, including: a reception unit configured to receive, from the user device, a control signal notifying whether there is a capability to simultaneously transmit an uplink signal in an allocated discontinuous frequency band, in which the control signal is configured to be notified for each operation band.

A second feature of the present invention is a user device configured to wirelessly communicate with a base station device in a mobile communication system, including: a transmission unit configured to transmit, to the base station device, a control signal notifying whether there is a capability to simultaneously transmit an uplink signal in an allocated discontinuous frequency band, in which the control signal is configured to be notified for each operation band.

Advantageous Effects of Invention

As described above, according to the present invention, a base station device and a user device can be provided, which is capable of determining whether the transmission of an uplink signal in a discontinuous frequency band is performed in accordance with the capability of the user device and a frequency band in which the user device actually performs communication, and of performing allocation of the frequency band in which the uplink signal is transmitted based on a result of the determination.

DESCRIPTION OF EMBODIMENTS

Figures 1, 2:
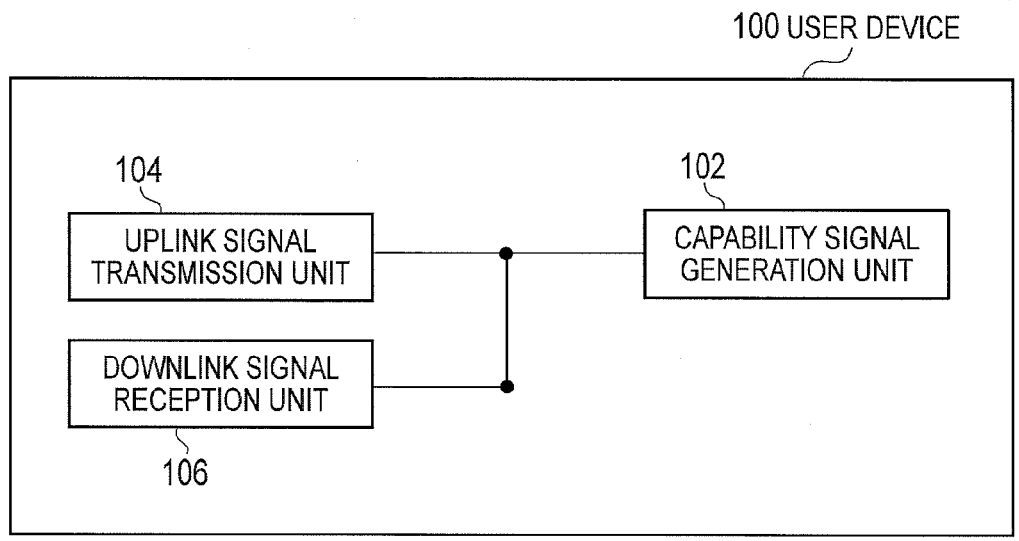
FIG. 1 is a function block diagram of a user device UE according to a first embodiment of the present invention.
FIG. 2 is a diagram illustrating an example of "information indicating whether the user device UE can transmit an uplink signal in a discrete frequency band" generated by the user device UE according to the first embodiment of the present invention.

A Mobile Communication System According to a First Embodiment of the Present Invention Hereinafter, a mobile communication system according to a first embodiment of the present invention will be described with reference to the drawings. In all drawings for describing the present embodiment, ones having the same function are denoted with the same reference sign, and repetitive description is omitted.

A mobile communication system according to the present embodiment is a system to which the LTE system or the LTE-Advanced system is applied.

That is, the mobile communication system according to the present embodiment is provided with a base station device eNB and a user device UE communicating with the base station device eNB, and the base station device eNB and the user device UE perform communication using the LTE system or the LTE-Advanced system. Note that the user device UE may be called mobile terminal.

When the LTE-Advanced system is applied in the mobile communication system according to the present embodiment, the "carrier aggregation" may be applied, that is, communication using a plurality of CCs is performed in an uplink or in a downlink.

Note that, when the LTE system is applied to the mobile communication system according to the present embodiment, communication using one CC is performed.

Here, the CC corresponds to one system carrier in the LTE system. That is, while communication using one CC is performed in the LTE system, communication using two or more CCs may be performed in the LTE-Advanced system.

In the mobile communication system according to the present embodiment, a PDSCH and a PDCCH (physical downlink control channel) shared by the user devices UE are used in the downlink.

Note that, in the LTE system or in the LTE-Advanced system, an "operating band" is defined as a group of frequency bands used in operation (Chapter 5.5 of Non-Patent Document 3).

As the "operating band", "Band 1" that is an "operating band" in the range of 2 GHz and "Band 5" that is an "operating band" in the range of 800 MHz, and the like are defined.

Typically, the user device UE notifies the "operating band" that the user device UE itself supports to the base station device eNB. That is, the user device UE typically has a capability to perform communication in one or two "operating bands", and notifies the "operating bands", in which the user device UE can exert the capability to perform communication, to the base station device eNB.

In addition, the base station device eNB notifies which "operating band" is used for the mobile communication service that the base station device eNB itself provides to the user device UE within an area of the base station device eNB itself with broadcast information.

Note that the CC is equivalent to one system carrier of the LTE system, and therefore, belongs to any of the "operating bands".

In the mobile communication system according to the present embodiment, a downlink data signal (user data, that is, a usual data signal) is transmitted through a PDSCH.

In addition, down link control signal are notified through the PDCCH, such as an ID of a user device UE that performs communication using the PDSCH, transport format information of a downlink data signal (that is, down scheduling information), an ID of a user device UE that performs communication using the PUSCH, and transport format information of an uplink control signal (that is, up scheduling grant).

The PDCCH may be called "downlink L1/L2 control channel". Further, the "down scheduling information" and the "up scheduling grant" may be collectively called "downlink control information (DCI)".

In the mobile communication system according to the present embodiment, the PUSCH and the PUCCH shared by the user devices UE are used in the uplink.

An uplink data signal (user data, that is, a normal data signal) is transmitted through the PUSCH.

In addition, through the PUCCH, quality information (channel quality indicator: CQI) of the downlink used for scheduling processing and adaptive modulation and coding scheme (AMCS) related to the PDSCH, and acknowledgement information related to the PDSCH are transmitted.

The quality information of the downlink may be called "channel state information (or indicator) (CSI)" that is an indicator bundling the "CQI", a "pre-coding matrix indicator (PMI)", and a "rank indicator (RI)".

The content of the acknowledgement information is expressed either in acknowledgement (ACK) that indicates a downlink signal has been properly received or in negative acknowledgement (NACK) that indicates a downlink signal has not been properly received.

As illustrated in FIG. 1, the user device UE related to the present embodiment is provided with a Capability signal generation unit 102, an uplink signal transmission unit 104, and a downlink signal reception unit 106.

Note that the Capability signal generation unit 102, the uplink signal transmission unit 104, and the downlink signal reception unit 106 are mutually connected.

The Capability signal generation unit 102 is configured to generate a Capability signal that notifies a capability of the user device UE (that is, Capability).

Here, the Capability signal includes information that indicates whether the user device UE can simultaneously transmit an uplink signal in a discrete frequency band (that is, in a discontinuous frequency band) that is notified by the user device UE.

That is, the Capability signal generation unit 102 may be configured to cause the information indicating whether the user device UE can simultaneously transmit an uplink signal in a discrete frequency band to be "1" when the user device UE can simultaneously the transmit an uplink signal in a discrete frequency band, and to cause the information indicating whether the user device UE can be simultaneously transmit an uplink signal in a discrete frequency band to be "0" when the user device UE cannot simultaneously transmit an uplink signal in a discrete frequency band.

Note that the information indicating whether an uplink signal can be simultaneously transmitted in a discrete frequency band may be set to each of a case where an uplink data signal is simultaneously transmitted in a discrete frequency band, and a case where an uplink data signal and an uplink control signal are simultaneously transmitted in a discrete frequency band.

In addition, the Capability signal generation unit 102 may be configured to generate a Capability signal including the information indicating whether an uplink signal can be simultaneously transmitted in a discrete frequency band for each frequency band that the user device UE supports, as illustrated in FIG. 2.

Here, the frequency band may be the above-described "operating band". The "operating band" may be called "frequency band".

That is, the user device UE may be configured to generate the Capability signal including the information indicating whether an uplink signal can be simultaneously transmitted in a discrete frequency band for each operation band that the user device UE supports.

Note that the frequency band may be more typically a frequency bandwidth.

Note that, when the carrier aggregation is performed between the user device UE and the base station device eNB, the information indicating whether an uplink signal can be simultaneously transmitted in a discrete frequency band may be notified to each carrier in which the carrier aggregation is performed.

Alternatively, in the case where the carrier aggregation is performed between the user device UE and the base station device eNB, when a plurality of carriers in performing the carrier aggregation belongs to two or more operation bands, the information indicating whether an uplink signal can be simultaneously transmitted in a discrete frequency band may be notified to each of the two or more operation bands.

Alternatively, in the case where the carrier aggregation is performed between the user device UE and the base station device eNB and when the information indicating whether an uplink signal can be simultaneously transmitted in a discrete frequency band is transmitted to each operation band, as described above, whether an uplink signal can be simultaneously transmitted in a discrete frequency band may be determined based on the information related to the operation bands to which the plurality of carriers in performing the carrier aggregation belongs.

To be specific, only when the information indicating whether an uplink signal can be simultaneously transmitted in a discrete frequency band has been notified to all of the operation bands to which the plurality of carriers in performing the carrier aggregation belongs, it may be determined that an uplink signal can be simultaneously transmitted in a discrete frequency band.

The uplink signal transmission unit 104 is configured to transmit an uplink data signal and an uplink control signal to the base station device eNB through the PUSCH and the PUCCH.

Note that the uplink signal transmission unit 104 is configured to transmit the Capability signal generated by the Capability signal generation unit 102 to the base station device eNB.

The downlink signal reception unit 106 is configured to receive a downlink data signal and a downlink control signal from the base station device eNB through the PDSCH and the PDCCH.

Figure 3:
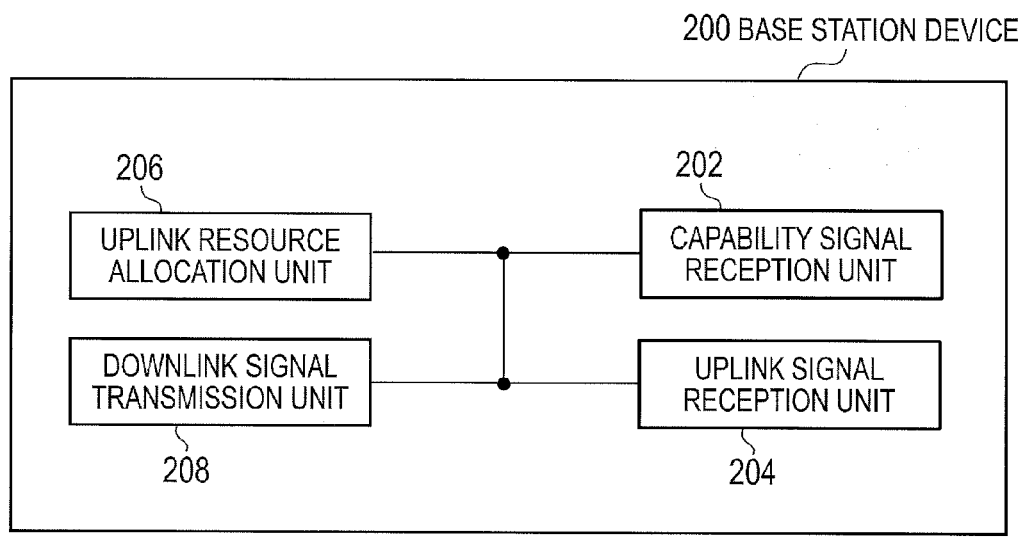
FIG. 3 is a function block diagram of a base station device eNB according to the first embodiment of the present invention.

As illustrated in FIG. 3, the base station device eNB related to the present embodiment is provided with a Capability signal reception unit 202, an uplink signal reception unit 204, an uplink resource allocation unit 206, and a downlink signal transmission unit 208.

The uplink signal reception unit 204 is configured to receive an uplink data signal and an uplink control signal from the user device UE through the PUSCH and the PUCCH.

The Capability signal reception unit 202 is configured to acquire the Capability signal from the uplink signal received by the uplink signal reception unit 204.

The Capability signal includes, as described above, the information notifying whether the user device UE can simultaneously transmit an uplink signal in a discrete frequency band (that is, a discontinuous frequency band). Further, the information can be notified to each frequency band that the user device UE supports, as described above.

The downlink signal transmission unit 208 is configured to transmit a downlink data signal and a downlink control signal to the user device UE through the PDSCH and the PDCCH.

The uplink resource allocation unit 206 is configured to determine to which user device UE a resource block is allocated from among a plurality of user devices UE for each subframe, and to allocate the resource block in which the uplink signal is transmitted to the user device UE.

To be specific, the uplink resource allocation unit 206 is configured to determine whether transmission of an uplink signal is performed based on the Capability signal received by the Capability signal reception unit 202, and to allocate the frequency band (resource block) in which the uplink signal is transmitted based on a result of the determination.

That is, when having been notified that the user device UE can simultaneously transmit an uplink signal in a discrete frequency band (that is, a discontinuous frequency band), the uplink resource allocation unit 206 allocates a resource in the discrete frequency band. Other than the above, the uplink resource allocation unit 206 allocates a resource in a continuous frequency band.

According to the mobile communication system according to the first embodiment of the present invention, the base station device eNB determines whether transmission of an uplink signal in a discontinuous frequency band is performed based on a Capability signal acquired from the user device UE in consideration of the capability of the user device and a frequency band in which the user device actually performs communication, and allocates the frequency band in which the uplink signal is transmitted.

The above-described features of the present embodiment may be expressed in follow manners.

A first feature of the present embodiment is a base station device eNB wirelessly communicating with a user device UE in a mobile communication, which includes a Capability signal reception unit 202 configured to receive, from the user device UE, a Capability signal (control signal) notifying whether there is a capability to simultaneously transmit an uplink signal in an allocated discontinuous frequency band, and the Capability signal is configured to be notified for each operation band.

In the first feature of the present embodiment, the Capability signal may be configured to notify whether there is a capability to simultaneously transmit an uplink data signal in an allocated discontinuous frequency band.

In the first feature of the present embodiment, the Capability signal may be configured to notify whether there is a capability to simultaneously transmit an uplink data signal an uplink control signal in an allocated discontinuous frequency band.

A second feature of the present embodiment is a user device UE wirelessly communicating with a base station device eNB in a mobile communication system, which includes an uplink signal transmission unit 104 configured to transmit, to the base station device UE, a Capability signal notifying whether there is a capability to simultaneously transmit an uplink signal in an allocated discontinuous frequency band, and the Capability signal is configured to be notified for each operation band.

In the second feature of the present embodiment, the Capability signal may be configured to notify whether there is a capability to simultaneously transmit an uplink data signal in an allocated discontinuous frequency band.

In the second feature of the present embodiment, the Capability signal may be configured to notify whether there is a capability to simultaneously transmit an uplink data signal and an uplink control signal in an allocated discontinuous frequency band.

Note that the operation of the above-described user device 100 and the base station device 200 may be implemented by hardware, may be implemented by a software module executed by a prosessor, or may be implemented by combination of the hardware and the software module.

The software module may be provided in a storage medium in an arbitrary format, such as a random access memory (RAM), a flash memory, a read only memory (ROM), an erasable programmable ROM (EPROM), an electronically erasable and programmable ROM (EEPROM), a register, a hard disk, a removable disk, or a CD-ROM.

The storage medium is connected to a prosessor so that the prosessor can read/write information to/from the storage medium. Further, the storage medium may be integrated in the prosessor. Further, the storage medium and the processor may be provided in an ASIC. The ASIC may be provided in the user device 100 and the base station device 200. Alternatively, the storage medium and the processor may be provided in the user device 100 and the base station device 200 as discrete components.

As described above, the present invention has been described in details using the above-described embodiments. However, it will be apparent to a person skilled in the art that the present invention is not limited to the embodiments described in the present specification. The present invention can be implemented as modifications and alternations without departing from the gist and scope of the present invention determined by the description of claims. Therefore, the description of the present specification is intended for exemplary illustration, and has no limitative meaning to the present invention.

REFERENCE SIGNS LIST

100 User device
102 Capability signal generation unit
104 Uplink signal transmission unit
106 Downlink signal reception unit
200 Base station device
202 Capability signal reception unit
204 Uplink signal reception unit
206 Uplink resource allocation unit
208 Downlink signal transmission unit

The invention claimed is:

1. A base station device with a processor and a storage unit that wirelessly communicates with a user device in a mobile communication system, the base station device comprising:
the processor receives, from the user device, a control signal notifying whether there is a capability for simultaneous uplink signal transmission in allocated discontinuous frequency bands,
wherein the control signal notifies for each operation band which the user device supports,
a first parameter value is set in the control signal, the control signal with the first parameter value indicating that the user device has the capability for simultaneous uplink signal transmission in allocated discontinuous frequency bands, and
a second parameter value is set in the control signal, the control signal with the second parameter value indicating that the user device does not have the capability for simultaneous uplink signal transmission in allocated discontinuous frequency bands.

2. The base station device according to claim 1, wherein the control signal notifies whether there is a capability for simultaneous uplink data signal transmission in allocated discontinuous frequency bands.

3. The base station device according to claim 1, wherein the control signal notifies whether there is a capability for simultaneous uplink data signal and uplink control signal transmission in allocated discontinuous frequency bands.

4. A user device that wirelessly communicates with a base station device in a mobile communication system, the user device comprising:
a capability signal generation unit that generates a control signal; and
a transmission unit that transmits, to the base station device, the control signal notifying whether there is a capability for simultaneous uplink signal transmission in allocated discontinuous frequency bands,
wherein the controls signal notifies for each operation band which the user device supports,
a first parameter value is set in the control signal, the control signal with the first parameter value indicating that the user device has the capability for simultaneous uplink signal transmission in allocated discontinuous frequency bands, and
a second parameter value is set in the control signal, the control signal with the second parameter value indicating that the user device does not have the capability for simultaneous uplink signal transmission in allocated discontinuous frequency bands.

5. The user device according to claim 4, wherein the control signal notifies whether there is a capability for simultaneous uplink data signal transmission in allocated discontinuous frequency bands.

6. The user device according to claim 4, wherein the control signal notifies whether there is a capability for simultaneous uplink data signal and uplink control signal transmission in allocated discontinuous frequency bands.

* * * * *

UNITED STATES PATENT AND TRADEMARK OFFICE
CERTIFICATE OF CORRECTION

| | | |
|---|---|---|
| PATENT NO. | : 9,066,347 B2 | Page 1 of 1 |
| APPLICATION NO. | : 13/985356 | |
| DATED | : June 23, 2015 | |
| INVENTOR(S) | : Hiroyuki Ishii et al. | |

It is certified that error appears in the above-identified patent and that said Letters Patent is hereby corrected as shown below:

ON THE TITLE PAGE

Under item (30) Foreign Application Priority Data, insert: -- February 14, 2011 (JP) JP2011-029034 --.

Signed and Sealed this
Twenty-fourth Day of November, 2015

Michelle K. Lee
*Director of the United States Patent and Trademark Office*